(12) United States Patent
Park et al.

(10) Patent No.: US 8,657,912 B2
(45) Date of Patent: Feb. 25, 2014

(54) DUST COLLECTING STRUCTURE FOR AIR-COOLING ELECTRIC APPARATUS AND ELECTRIC APPARATUS HAVING THE SAME

(75) Inventors: Jae-hyun Park, Seoul (KR); Jeong-ho Nho, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 166 days.

(21) Appl. No.: 13/244,300

(22) Filed: Sep. 24, 2011

(65) Prior Publication Data

US 2012/0247075 A1    Oct. 4, 2012

(30) Foreign Application Priority Data

Mar. 31, 2011  (KR) .................. 10-2011-0029762

(51) Int. Cl.
*B01D 45/00*    (2006.01)

(52) U.S. Cl.
USPC ............ 55/446; 55/442; 55/443; 55/444; 55/445; 55/437; 55/464; 55/DIG. 37

(58) Field of Classification Search
USPC ............ 55/442–446, 437, 462, 464, DIG. 37
See application file for complete search history.

(56) References Cited

U.S. PATENT DOCUMENTS

| 867,742 | A | * | 10/1907 | Morison | 55/434.3 |
| 1,825,274 | A | | 9/1931 | Leach | |
| 4,832,710 | A | * | 5/1989 | Jury | 95/269 |
| 6,010,554 | A | * | 1/2000 | Birmingham et al. | 95/32 |

FOREIGN PATENT DOCUMENTS

| DE | 380441 C | 9/1923 |
| DE | 394895 C | 5/1924 |
| DE | 549398 C | 4/1932 |

OTHER PUBLICATIONS

Communication dated Feb. 22, 2012 issued by the European Patent Office in European Application No. 11185585.4.

\* cited by examiner

*Primary Examiner* — Dung H Bui
(74) *Attorney, Agent, or Firm* — Sughrue Mion, PLLC

(57) ABSTRACT

A dust collecting structure for an air-cooling electric apparatus includes a plurality of first vortex generating members which are disposed at a predetermined interval in a case and form a plurality of suction inlets; and a plurality of second vortex generating members which are disposed in an inner direction of the case and are spaced a predetermined distance apart from the suction inlets, wherein each of the first vortex generating members projects inside the case and has a shape that allows the air, which is sucked through the suction inlets by a suction fan, to generate a vortex near a rear end of the first vortex generating member, and wherein each of the second vortex generating members has a shape that divides the air into air streams and allows the air streams to generate a vortex near a rear end of the second vortex generating member.

18 Claims, 10 Drawing Sheets

DUST COLLECTING STRUCTURE FOR AIR-COOLING ELECTRIC APPARATUS AND ELECTRIC APPARATUS HAVING THE SAME

CROSS-REFERENCE TO RELATED APPLICATION

This application claims priority from Korean Patent Application No. 10-2011-0029762 filed Mar. 31, 2011 in the Korean Intellectual Property Office, the disclosure of which is incorporated herein by reference in its entirety.

BACKGROUND

1. Field

Apparatuses consistent with exemplary embodiments relate to an air-cooling electric apparatus, and, more particularly, to a dust collecting structure usable with an air-cooling electric apparatus that separates dust from air that is sucked therein.

2. Description of the Related Art

With recent developments, not only are techniques for basic functions of an electric apparatus evaluated but also techniques that allow the basic functions to be maintained and functioning for a long time are evaluated as main performance criterion of the electric apparatus.

In an air-cooling electric apparatus which cools an inner heat generating source using outside air, for maintaining functions of the electric apparatus for a long time, dust which is sucked into the electric apparatus must be removed. For removing dust from the sucked air, a conventional air-cooling electric apparatus generally uses a dust filter.

The dust filter is formed so that a filter member having a lot of fine holes or lattices is folded in many folds. Therefore, the sucked air passes through the fine holes or lattices and dust is filtered by the filter member. If the dust filter has been used for a long time, the fine holes or lattices are blocked by dust. Therefore, the electric apparatus that uses the dust filter is inconvenient to users because the dust filter must be regularly cleaned or replaced.

In an electric apparatus that is cooled by an air cooling method, if a dust filter having close holes or lattices is used to block dust from entering inside of the electric apparatus, it is difficult for cold outer air to flow into the inside of the electric apparatus. Accordingly, cooling performance of the electric apparatus may be decreased. On the contrary, if a dust filter having large holes or lattices is used, it is easy for the outer air to flow into the electric apparatus, thereby increasing the cooling performance. However, usage of the dust filter having large holes or lattices may reduce dust removing efficiency, thereby decreasing the performance of the electric apparatus.

Accordingly, a conventional air-cooling electric apparatus uses a dust filter having proper size holes to remove dust from air being sucked therein and is managed by regularly cleaning or replacing the dust filter.

However, because users do not properly manage the dust filter of the conventional air-cooling electric apparatus, the air-cooling electric apparatus is frequently broken down. Therefore, reliability of the electric apparatus is reduced and a cost thereof is increased.

Accordingly, a dust collecting structure is needed which does not use the dust filter but can collect dust.

SUMMARY

One or more exemplary embodiments provide a dust collecting structure for an air-cooling electric apparatus which can separate and collect dust without usage of a dust filter.

According to an aspect of an exemplary embodiment, there is provided a dust collecting structure for an apparatus which is used in the apparatus having a suction fan for sucking air. The dust collecting structure may include a plurality of first vortex generating members which are disposed at a predetermined interval in a case of the apparatus and form a plurality of suction inlets; and a plurality of second vortex generating members which are disposed in an inner direction of the case and are spaced a predetermined distance apart from the plurality of suction inlets, wherein each of the plurality of first vortex generating members projects inside the case and allows the air, which is sucked through the suction inlets by the suction fan, to generate a first vortex near a rear end of at least one of the plurality of first vortex generating members, and wherein each of the plurality of second vortex generating members divides the air into air streams and allows the air streams to generate a second vortex near a rear end of at least one of the plurality of second vortex generating members.

At least one of the plurality of first vortex generating members may include a guide portion which has a curved shape to guide the air which is flowed in through the suction inlet to form the first vortex; and wing portions which project from opposite side ends of the guide portion.

A section of the wing portions may include at least one of a triangle shape, a rectangular shape, and a trapezoid shape.

The guide portion of the first vortex generating member may be formed as a concave shape.

A section of at least one of the plurality of second vortex generating members may have a wedge shape, and both side inclined surfaces of the wedge shape may be disposed to gather toward the suction inlet.

A first portion of the section of at least one of the plurality of second vortex generating members which faces the suction inlet may include a triangle shape.

A first portion of the section of at least one of the plurality of second vortex generating members which faces the suction inlet may include a streamlined shape.

A second portion of at least one of the plurality of second vortex generating members which is opposite to a first portion facing the suction inlet, may include a groove which generates a flow resistance with respect to the air.

The plurality of second vortex generating members may be arranged in at least two rows, and each of the second vortex generating members in a back row may be arranged to face a space between the second vortex generating members in a front row.

The plurality of second vortex generating members may be arranged in a zigzag pattern.

The plurality of first and second vortex generating members may be formed as a single body with the case.

The plurality of first and second vortex generating members may be disposed in a housing which is detachable to case.

The dust collecting structure may include a guide duct which is disposed inside the case and guides the air that has passed through the plurality of first and second vortex generating members to the suction fan; and a plurality of vortex generating grooves which are formed on an inner surface of the guide duct and allow the sucked air to generate a vortex.

The dust collecting structure may include at least one dust-discharging opening which is formed on a bottom side of the case and near the rear end of each of some of the plurality of first and second vortex generating members.

The dust collecting structure may include at least one dust cling member which is disposed at a rear end of at least some of the plurality of first and second vortex generating members.

The dust collecting structure may include at least one dust-discharging opening which is formed on a bottom side of the case and substantially close to the rear end of at least some of the plurality of first and second vortex generating members; and at least one dust cling member which is disposed at a rear end of others of the plurality of first and second vortex generating members.

According to an aspect of an exemplary embodiment, there is provided an electric apparatus. The electric apparatus includes: a suction fan which sucks air, and a dust collecting structure. The dust collecting structure includes: a plurality of first vortex generating members which are disposed in a case of the apparatus and form a plurality of suction inlets; and a plurality of second vortex generating members which are disposed in the case and are spaced apart from the plurality of suction inlets.

Each of the plurality of first vortex generating members may project inside the case and allow the air, which is sucked through the suction inlets by the suction fan, to generate a vortex near a rear end of at least one of the plurality of first vortex generating members, and wherein each of the plurality of second vortex generating members divides the air into air streams and allows the divided air streams to generate a vortex near a rear end of at least one of the plurality of second vortex generating members Other features of exemplary embodiments will become apparent from the following detailed description, when taken in conjunction with the accompanying drawings.

BRIEF DESCRIPTION OF THE DRAWINGS

These and/or other aspects of the present disclosure will become apparent and more readily appreciated from the following description of exemplary embodiments, taken in conjunction with the accompanying drawings of which.

Throughout the drawings, like reference numerals will be understood to refer to like parts, components and structures.

DETAILED DESCRIPTION OF EXEMPLARY EMBODIMENTS

Hereinafter, certain exemplary embodiments of the present disclosure will be described in detail with reference to the accompanying drawings.

The matters defined herein, such as a detailed construction and elements thereof, are provided to assist in a comprehensive understanding of this description. Thus, it is apparent that exemplary embodiments may be carried out without those defined matters. Also, well-known functions or constructions are omitted to provide a clear and concise description of exemplary embodiments. Further, dimensions of various elements in the accompanying drawings may be arbitrarily increased or decreased for assisting in a comprehensive understanding.

Figure 1:
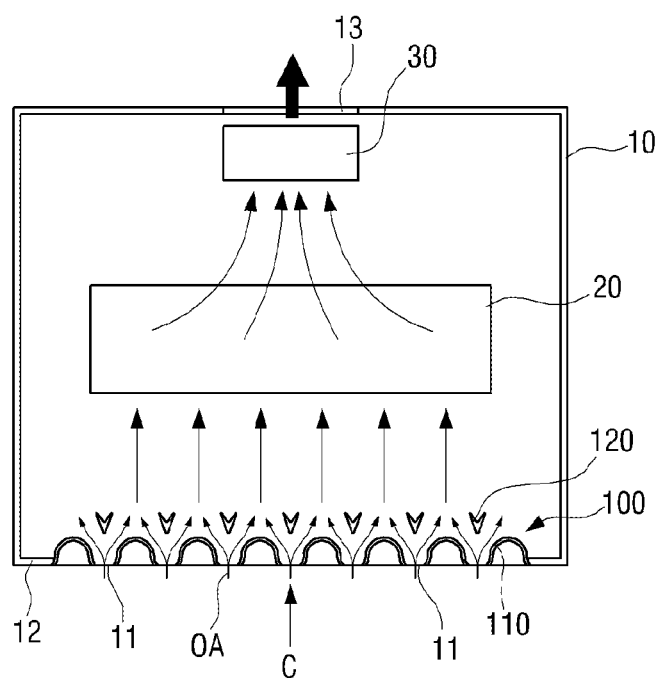
FIG. 1 is a view conceptually illustrating an electric apparatus which has a dust collecting structure for an air-cooling electric apparatus according to an exemplary embodiment.
Figure 2:
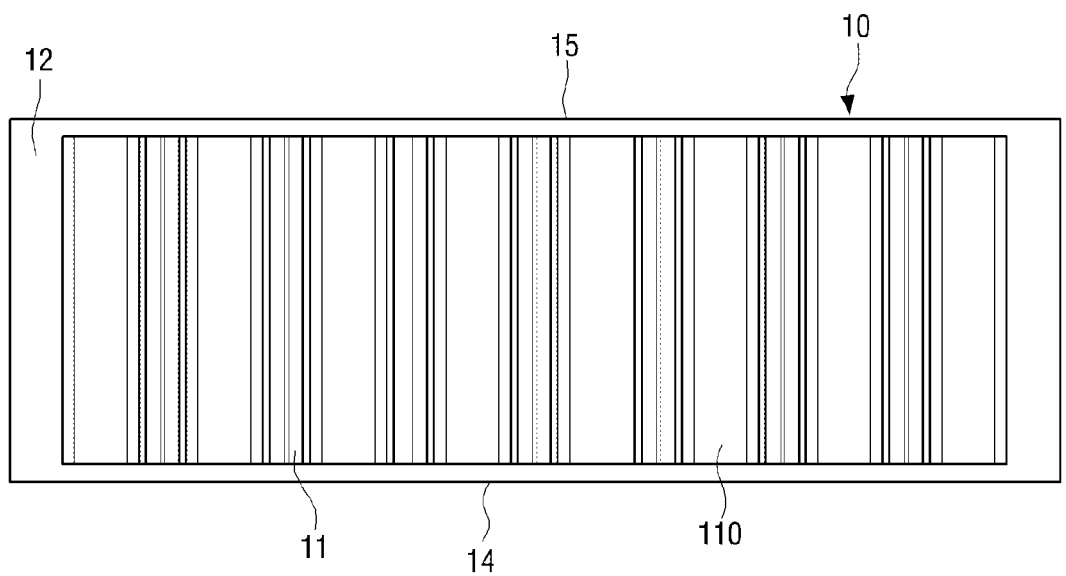
FIG. 2 is a view illustrating the electric apparatus of FIG. 1 being viewed in a direction of arrow C in FIG. 1.
Figure 3:
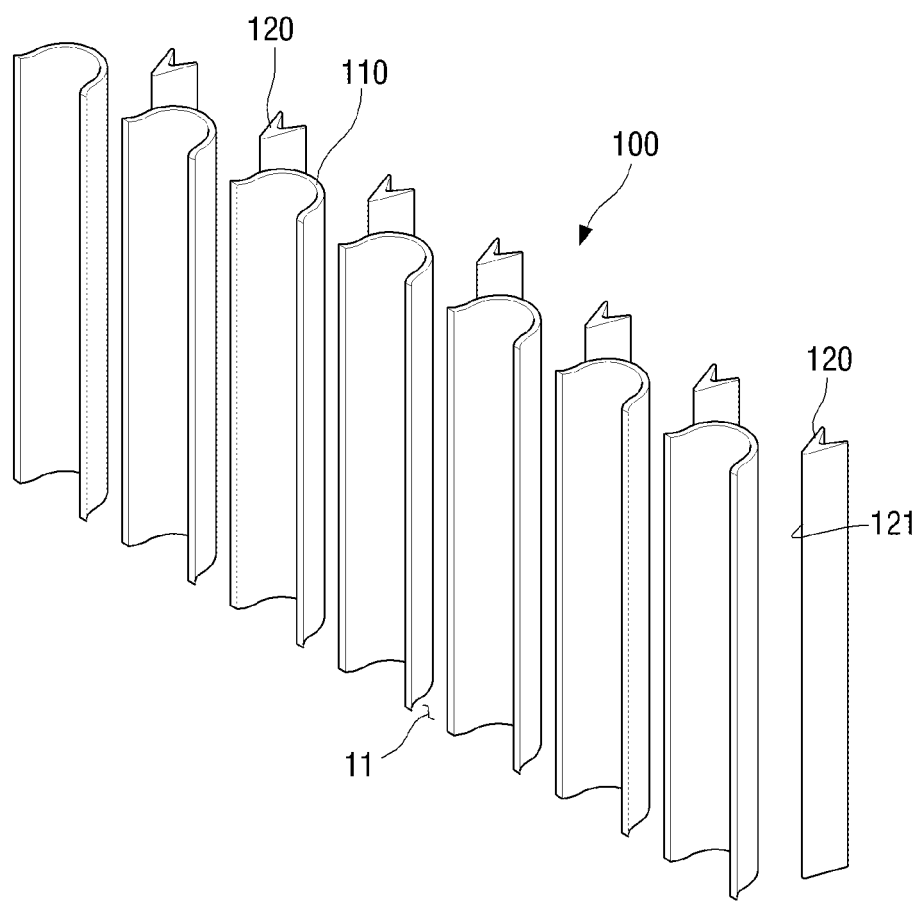
FIG. 3 is a perspective view illustrating a dust collecting structure which is disposed in the electric apparatus of FIG. 1.

FIG. 1 is a view conceptually illustrating an electric apparatus which has a dust collecting structure for an air-cooling electric apparatus according to an exemplary embodiment. FIG. 2 is a view illustrating the electric apparatus of FIG. 1 being viewed in a direction of arrow C in FIG. 1. FIG. 3 is a perspective view illustrating a dust collecting structure which is disposed in the electric apparatus of FIG. 1.

Referring to FIG. 1, the air-cooling electric apparatus 1 may include a case 10, a heat generating source 20, a suction fan 30, and a dust collecting structure 100.

The case 10 forms an outer appearance of the air-cooling electric apparatus 1 (or an air-cooling electronic apparatus) and includes suction inlets 11 through which outer air enters an inside of the case 10. Hear, the air-cooling electric apparatus represents an apparatus that performs a predetermined function using electricity and cools the heat generating source 20 which is disposed therein using outer air (OA) to maintain an inner temperature thereof below a predetermined temperature. For example, the air-cooling electric apparatus may include a projector, a projection TV, and the like.

Although in FIG. 1 the case 10 is illustrated to have a section of a rectangular shape, this is only one example; therefore, the case 10 may be formed to have various shapes according to the function of the electric apparatus 1.

The heat generating source 20 is disposed inside the case 10 and includes parts that generate heat while the electric apparatus 1 performs a predetermined function.

The suction fan 30 is disposed in an end portion of the case 10 and generates a suction force that sucks outer air into the inside of the case 10 of the electric apparatus 1. Therefore, when the suction fan 30 operates, the outer air OA is sucked inside the case 10 so as to pass by the heat generating source 20, pass through the suction fan 30 and be discharged outside the case 10 through a discharging opening 13 of the case 10.

The dust collecting structure 100 is used instead of the conventional dust filter and is configured so that the outer air OA is smoothly sucked in and relatively large dust is effectively separated from the sucked outer air OA.

Referring to FIGS. 1 to 3, the dust collecting structure 100 according to an exemplary embodiment may include a plurality of first vortex generating members 110 and a plurality of second vortex generating members 120.

The plurality of first vortex generating members 110 are formed integrally with the case 10 and form a plurality of suction inlets 11 through which the outer air OA is sucked. In other words, the plurality of first vortex generating members 110 may be formed as one single body with a front side 12 of the case 10 when the case 10 is formed. The plurality of first vortex generating members 110 are disposed parallel to each other and at a predetermined interval in the case 10. Two first vortex generating members 110 which are nearby each other form a suction inlet 11.

Figure 4:
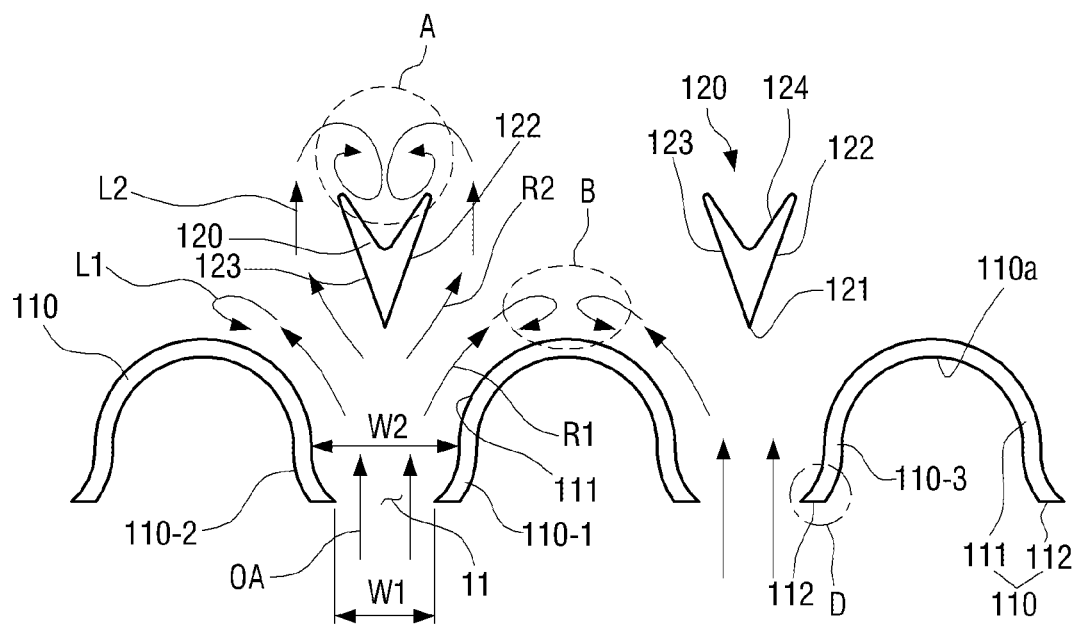
FIG. 4 is a view for explaining an operating principle of the dust collecting structure of FIG. 1.
Figure 6:
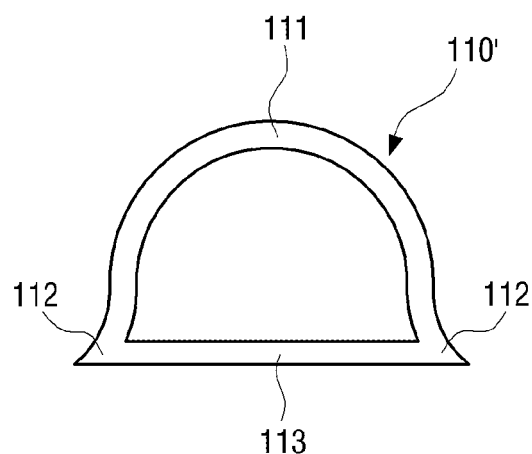
FIG. 6 is a view illustrating an example of a first vortex generating member of the dust collecting structure of FIG. 1.

Each of the plurality of first vortex generating members 110 projects inside the case 10 and has a length corresponding to a distance between a top side 15 and a bottom side 14 of the case 10. A section of the first vortex generating member 110 is formed as a curved shape which causes the outer air OA which is sucked through the suction inlet 11 by the suction fan 30 to generate a vortex near a rear end B of the first vortex generating member 110 as illustrated in FIG. 4. The first vortex generating member 110 which performs the function as described above may include a guide portion 111 and wing portions 112 as illustrated in FIG. 4. The guide portion 111 guides the outer air OA which is sucked through the suction inlet 11 to form the vortex and has a curved shape. The guide portion 111 may be formed as a concave shape toward the inside of the case 10 as illustrated in FIGS. 1 and 3; that is, a concave shape in a moving direction of the outer air OA. In other words, the first vortex generating member 110 may be formed as a channel shape having a curved section. Therefore, the first vortex generating members 110 are arranged so that entrances of concave portions 110a thereof face the outside of the case 10. Alternatively, the first vortex generating members 110 may be formed to have a wall 113 between the wing portions 112 as illustrated in FIG. 6. At this time, the first vortex generating members 110 has a pillar shape with a curved section.

Referring to FIG. 4, the wing portions 112 of a center first vortex generating member 110-1 project from opposite side ends of the guide portion 111 toward two nearby first vortex generating members 110-2 and 110-3. Therefore, a space between the wing portions 112 of two nearby first vortex generating members 110-2 and 110-3 forms one suction inlet 11. The projecting wing portions 112 help the air which passed through the suction inlet 11 to form a vortex at a rear end of the first vortex generating member 110, that is, near a rear end portion B of the guide portion 111. Therefore, a width W1 of the suction inlet 11 being narrower than the width W2 of an inside of the suction inlet 11 helps the first vortex generating members 110 to easily generate a vortex of air. Herein, the width W2 of the inside of the suction inlet 11 is a distance between the guide portions 111 of two nearby first vortex generating members 110-1 and 110-2. The guide portions 111 of the two nearby first vortex generating members 110-1 and 110-2 form an air passage through which the outer air OA passes.

Figure 7:
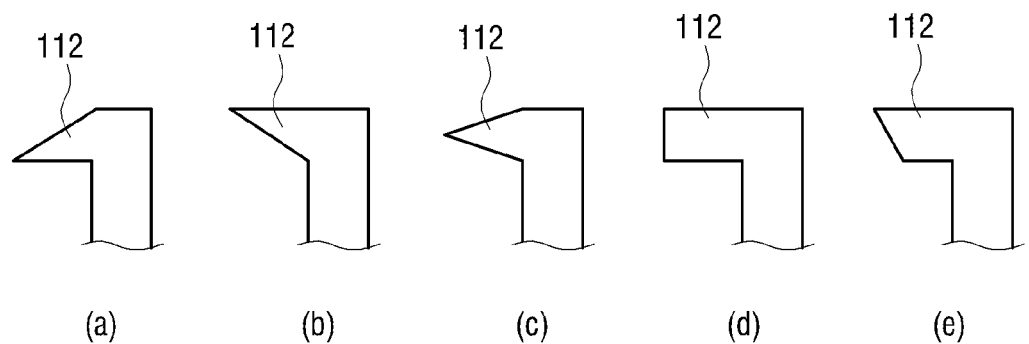
FIG. 7 reflects partial views illustrating various examples of a wing portion of the first vortex generating member of the dust collecting structure of FIG. 4.

The wing portion 112 may be formed as various shapes as long as it projects from the guide portion 111. For example, the wing portion 112 may be formed as various triangle sections as illustrated in (a), (b) and (c) of FIG. 7, as a rectangular section as illustrated in (d) of FIG. 7, or a trapezoid section as illustrated in (e) of FIG. 7.

The shape and size of the first vortex generating members 110, the width W1 and number of the suction inlets 11 and the width W2 of the inside of the suction inlet 11 may be properly determined according to a cooling capacity which the electric apparatus 1 requires when the dust collecting structure 100 according to an exemplary embodiment is applied to the electric apparatus 1.

The plurality of second vortex generating members 120 are disposed inside the case 10 and spaced apart a predetermined distance from the plurality of suction inlets 11. The plurality of second vortex generating members 120 may be formed as one single body with the case 10 when the case 10 is formed.

Each of the plurality of second vortex generating members 120 is formed as a shape to divide the outer air OA which is sucked through the suction inlets 11 into two air streams and to allow the two divided air streams to form a vortex near a rear end A of the second vortex generating member 120.

Figure 8:
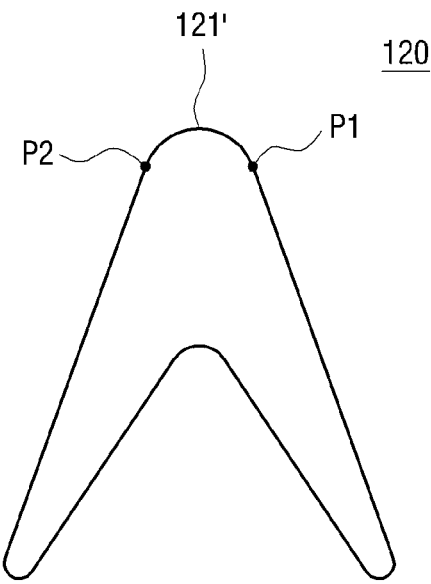
FIG. 8 is a view illustrating an example of a second vortex generating member of the dust collecting structure of FIG. 1.

Referring to FIG. 3, the second vortex generating members 120 may be formed so that a front end 121 of the second vortex generating member 120 which faces the suction inlet 11 is a straight line and a rear end thereof which faces a direction receding from the suction inlet 11 is formed to have a shape splaying out to opposite sides based on the straight line forming the front end. Therefore, a section of the second vortex generating member 120 has two side surfaces 122 and 123 as illustrated in FIG. 4, and the two side surfaces 122 and 123 are formed as two inclined surfaces which are gathered toward the suction inlet 11 and are splayed out to opposite sides when the two side surfaces 122 and 123 go away from the suction inlet 11. In other words, the section of the second vortex generating member 120 may be formed as a wedge shape of which two inclined surfaces 122 and 123 are gathered to one point. At this time, a front end portion 121 which faces the suction inlet 11 in the section of the second vortex generating member 120 having the wedge shape may be formed as a triangle shape. Alternatively, as illustrated in FIG. 8, a front end portion 121' of the section of the second vortex generating member 120 may be formed as a streamlined shape. In FIG. 8, the front end portion 121' that is formed as a streamlined shape represents a portion between points P1 and P2.

Figure 5:
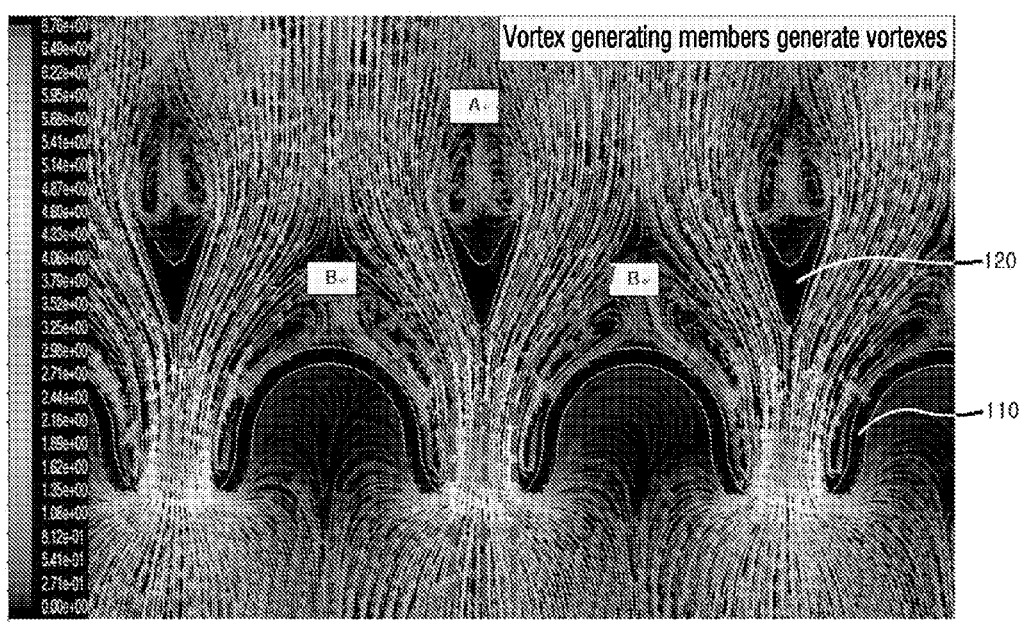
FIG. 5 is a view illustrating a result of a computer simulation of a state in which a dust collecting structure for an air-cooling electric apparatus according to an exemplary embodiment separates dust.

A groove may be formed in the rear end portion 124 of the second vortex generating member 120 that faces opposite to the suction inlet 11 so that the two air streams divided by the second vortex generating member 120 smoothly form a vortex in the rear end portion 124 of the second vortex generating member 120. At this time, the second vortex generating member 120 is formed as a channel having a section of a substantially V shape as illustrated in FIG. 3. The groove 124 generates a flow resistance with respect to the air which flows along the second vortex generating member 120 and promotes the generation of the vortex. Therefore, the air moving along the second vortex generating members 120 forms the vortex at an area A near the rear end portion of the second vortex generating member 120 as illustrated in FIGS. 4 and 5.

Figure 9:
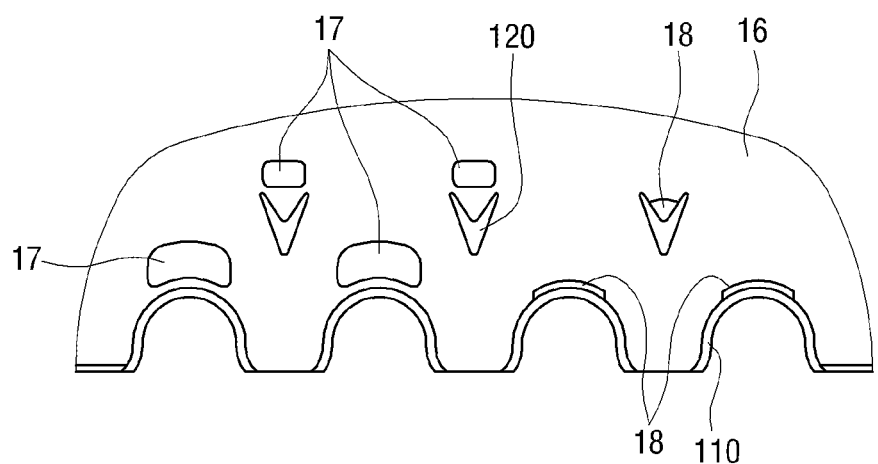
FIG. 9 is a partially sectional view illustrating a dust-discharging opening and a dust attaching member of the dust collecting structure of FIG. 1.

A dust-discharging opening 17 may be formed at a bottom side 16 of the case 10 to collect dust separated by the vortexes which are formed at areas B near the rear end portions of the first vortex generating members 110 and at areas A near the rear end portions of the second vortex generating members 120 (see FIG. 9). Alternatively, a dust cling member 18 which captures dust collected by the vortex may be disposed inside the case 10. Also, the dust-discharging openings 17 may be formed on the bottom side 16 of the case 10 near the rear ends of some of the first and second vortex generating members 110 and 120 and the dust cling members 18 may be disposed on the rear ends of others of the first and second vortex generating members 110 and 120.

FIG. 9 illustrates the dust-discharging openings 17 which are formed on the bottom side 16 of the case 10 near the rear ends of some of the first and second vortex generating members 110 and 120 and the dust cling members 18 which are adhered on the rear ends of others of the first and second vortex generating members 110 and 120. Therefore, when the suction fan 30 stops, the dust which is collected by the vortex falls down and is discharged through the dust-discharging opening 17 outside the case 10. If the dust cling members 18 are disposed on the rear ends of the first and second vortex generating members 110 and 120, when the suction fan 30 stops, the dust which is collected by the vortex is adhered onto the near dust cling member 18.

Hereinafter, operation of the dust collecting structure 100 having the structure as described above will be explained with reference to FIGS. 1, 4 and 5. FIG. 5 is a view illustrating a computer simulation result of a state in which the dust collecting structure 100 according to an exemplary embodiment separates dust.

When the suction fan 30 is operated, a suction force is generated so that outer air OA is flowed into the inside of the case 10 through the suction inlets 11 between the plurality of first vortex generating members 110.

The outer air OA which is sucked through the suction inlets 11 is divided into two air streams as illustrated in FIGS. 4 and 5 by the second vortex generating member 120. In FIG. 4, a right air stream which is branched to a right side of the second vortex generating member 120 passes through between the a right inclined surface 122 of the second vortex generating member 120 and the guide portion 111 of a right first vortex generating member 110.

Some R1 of the right air stream moves along the guide portion 111 of the right first vortex generating member 110-1. When the air moves along the guide portion 111, a back flow is generated at an area B near the rear end of the guide portion 111 due to the difference of the flow resistance so that a drag force is generated. The drag force generates a vortex at the area B near the rear end of the first vortex generating member 110 and the dust, which is contained in the sucked outer air OA, is separated from the outer air OA by the vortex and then is confined in the vortex.

Also, the other R2 of the right air stream moves along the right inclined surface 122 of the second vortex generating member 120. When the air moves along the right inclined surface 122, a back flow is generated at an area A near the rear end of the right inclined surface 122 due to the difference of the flow resistance so that a drag force is generated. The drag force generates a vortex at the area A near the rear end of the second vortex generating member 120 and the dust, which is contained in the sucked outer air OA, is separated from the outer air OA by the vortex and then is confined in the vortex. Since the dust which is flowed in with the right air stream is confined by the vortexes which are formed at the areas B and A near the rear ends of the first and second vortex generating members 110 and 120, the dust does not flow into the inside of the case 10.

Also, in FIG. 4, a left air stream L2 and L1 which is branched to a left side of the second vortex generating member 120 passes through between a left inclined surface 123 of the second vortex generating member 120 and the guide portion 111 of a left first vortex generating member 110-2.

Some air stream L1 of the left air stream moves along the guide portion 111 of the left first vortex generating member 110-2 and the other air stream L2 of the left air stream moves along the left inclined surface 123 of the second vortex generating member 120. When the air moves along the guide portion 111 of the first vortex generating member 110 and the left inclined surface 123 of the second vortex generating member 120, vortexes are generated at the area B near the rear end of the first vortex generating members 110 and at the area A near the rear end of the second vortex generating members 120 due to the same principle as explained above. The dust, which is contained in the sucked outer air OA, is separated from the outer air OA by the vortexes and then is confined in the vortexes. Since the dust which is flowed in with the left air stream is confined by the vortexes which are formed at the areas B and A near the rear ends of the first and second vortex generating members 110 and 120, the dust does not flow into the inside of the case 10.

The outer air OA from which the dust is separated by the dust collecting structure 100 passes by the heat generating source 20. While the cold outer air OA passes by the heat generating source 20, the heat generating source 20 is cooled and the outer air OA is heated due to a heat exchange. The heated outer air passes through the suction fan 30 and then is discharged to the outside through the discharging opening 13 of the case 10.

Because the air-cooling electric apparatus 1 having the dust collecting structure 100 according to an exemplary embodiment sucks the outer air OA into the inside of the case 10 through the suction inlet 11 which has a size larger than that of the fine holes of the dust filter 30, the electric apparatus 1 can be cooled below a predetermined temperature even if a suction fan 30 is used which has a capacity smaller than that of a suction fan 30 using a dust filter. Also, because the dust collecting structure 100 according to an exemplary embodiment can separate and collect relatively large dust which can be attached on the heat generating source 20 inside the case 10, the electric apparatus 1 can prevent the performance thereof from being degraded due to the dust.

When the suction fan 30 stops, outer air OA does not flow into the case 10 through the suction inlets 11. Then, the vortexes which are formed at the area B and A near the rear ends of the first and second vortex generating members 110 and 120, respectively, are terminated. When the vortexes are terminated, the dust which is confined by the vortexes falls down. At this time, since there are dust-discharging openings 17 on the bottom side 16 of the case 10, the falling dust is discharged outside the case 10.

The air-cooling electric apparatus 1 having the dust collecting structure 100 according to an exemplary embodiment can discharge the collected dust outside the case 10; therefore, it is easy to maintain compared to the electric apparatus using the dust filter.

Figure 10:
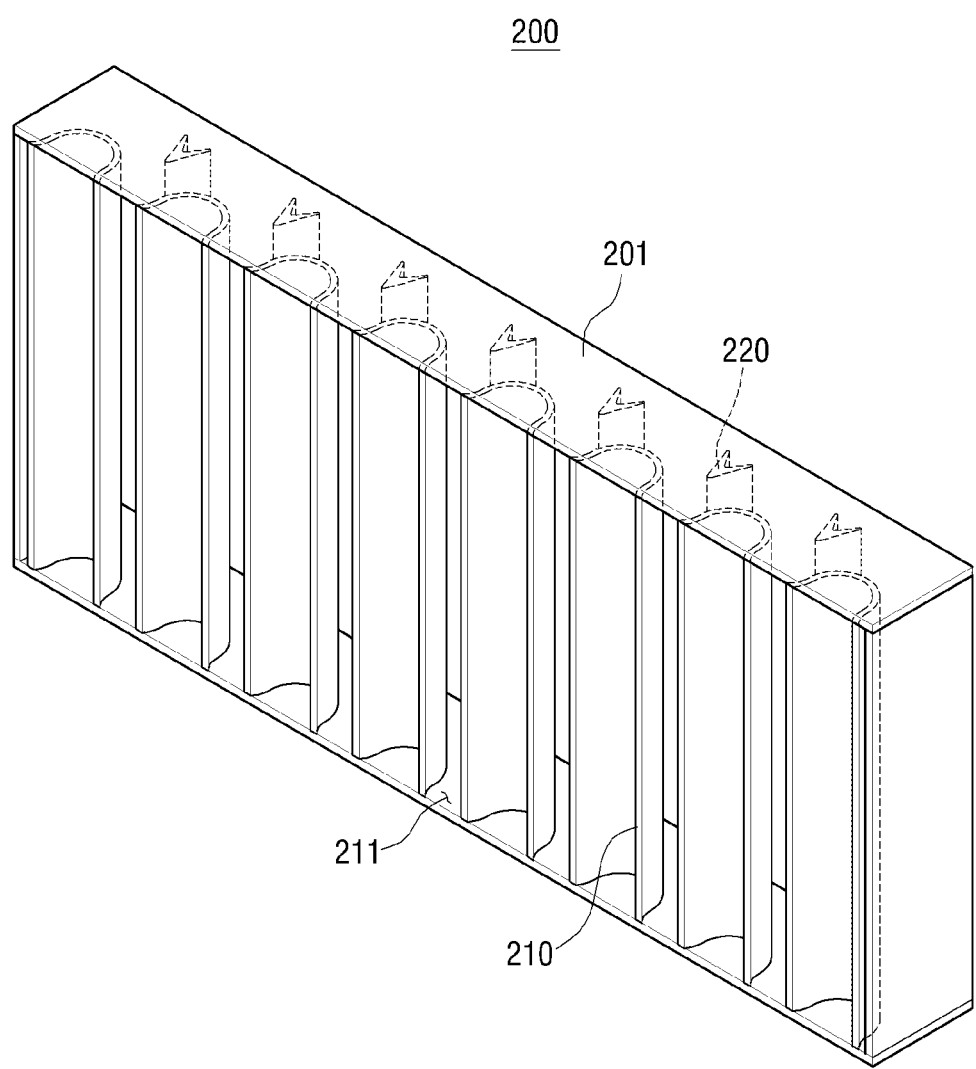
FIG. 10 is a perspective view illustrating a dust collecting structure for an air-cooling electric apparatus according to an exemplary embodiment being disposed in a housing.

FIG. 10 is a perspective view illustrating a dust collecting structure for an air-cooling electric apparatus according to an exemplary embodiment.

The dust collecting structure 200 as illustrated in FIG. 10 is different from the above described dust collecting structure 100 in that first and second vortex generating members 210 and 220 thereof are disposed in a housing 201. The housing 201 is formed separately from the case 10 of the electric apparatus 1 and is detachably mounted into a mounting opening (not illustrated) which is formed in the case 10 of the electric apparatus 1. The first and second vortex generating members 210 and 220 are disposed at predetermined intervals inside the housing 201. The arrangement of the first and second vortex generating members 210 and 220 is the same as that of the first and second vortex generating members 110 and 120 according to the above described embodiment; therefore, detail explanation thereof will be omitted.

Figure 11:
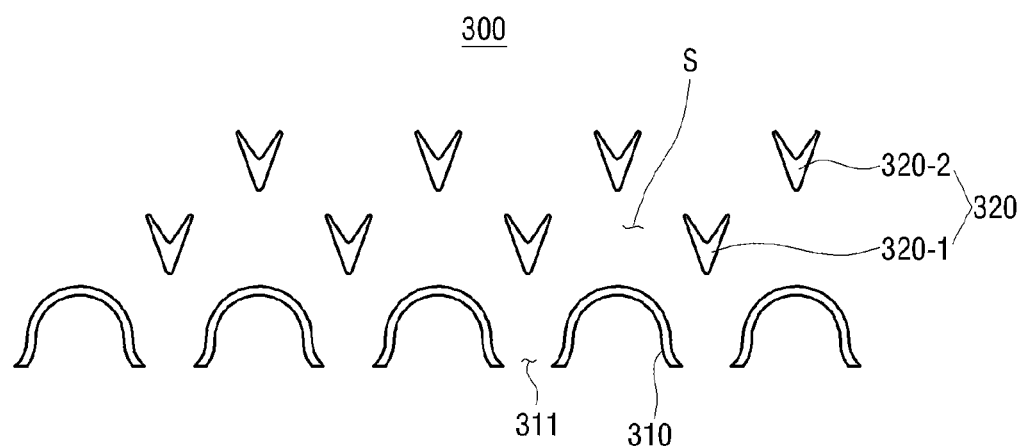
FIG. 11 is a partially sectional view schematically illustrating a dust collecting structure for an air-cooling electric apparatus according to an exemplary embodiment.
Figure 12:
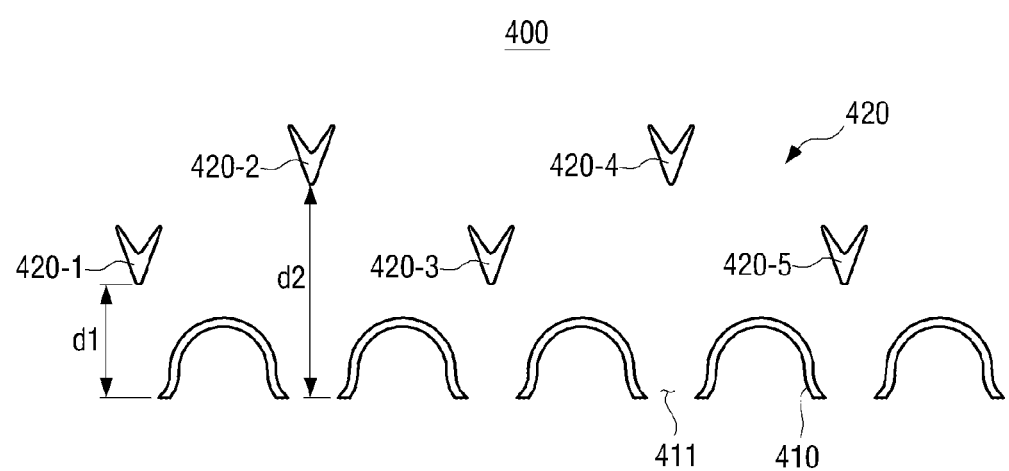
FIG. 12 is a partially sectional view schematically illustrating a dust collecting structure for an air-cooling electric apparatus according to an exemplary embodiment.

FIGS. 11 and 12 are a partially sectional view schematically illustrating a dust collecting structure for an air-cooling electric apparatus according to an exemplary embodiment.

Referring to FIG. 11, a dust collecting structure 300 according to an exemplary embodiment is different from the dust collecting structure 100 as illustrated in FIG. 1 in that second vortex generating members 320 are arranged in two rows. First vortex generating members 310 and a first row of second vortex generating members 320 near the first vortex generating members 310 are arranged equally with the first and second vortex generating members 110 and 120 of the dust collecting structure 100 of FIG. 1. A second row of second vortex generating members 320-2 is disposed to face the first vortex generating members 310 through spaces S between the second vortex generating members 320-1 forming the first row.

In the present exemplary embodiment, operation in which the first vortex generating members 310 and the second vortex generating members 320 which are arranged in two rows separate dust from outer air OA which is sucked through suction inlets 311 is similar to that of the first and second vortex generating members 110 and 120 according to an exemplary embodiment as described above; therefore, a detailed explanation thereof will be omitted.

Referring to FIG. 12, a dust collecting structure 400 according to an exemplary embodiment is different from the dust collecting structure 100 as illustrated in FIG. 1 in that second vortex generating members 420 are arranged in zigzag. If a second vortex generating member 420-1 being first from the left side in FIG. 12 is disposed near a suction inlet 411, a second vortex generating member 420-2 being second from the left side in FIG. 12 is disposed in a position father away from the suction inlet 411 than the first second vortex generating member 420-1. Second vortex generating members 420-3 and 420-5 being third and fifth from the left side are disposed to have the same distance d1 from the suction inlet 411 as the first second vortex generating member 420-1. A second vortex generating member 420-4 being fourth from the left side is disposed to have the same distance d2 from the suction inlet 411 as the second-second vortex generating member 420-2. Therefore, the second vortex generating members 420 are arranged in zigzag.

In the present exemplary embodiment, operation in which the first vortex generating members 410 and the zigzag arranged second vortex generating members 420 separate dust from outer air OA which is sucked through suction inlets 411 is similar to that of the first and second vortex generating members 110 and 120 according to an exemplary embodiment as described above; therefore, a detailed explanation thereof will be omitted.

Figure 13:
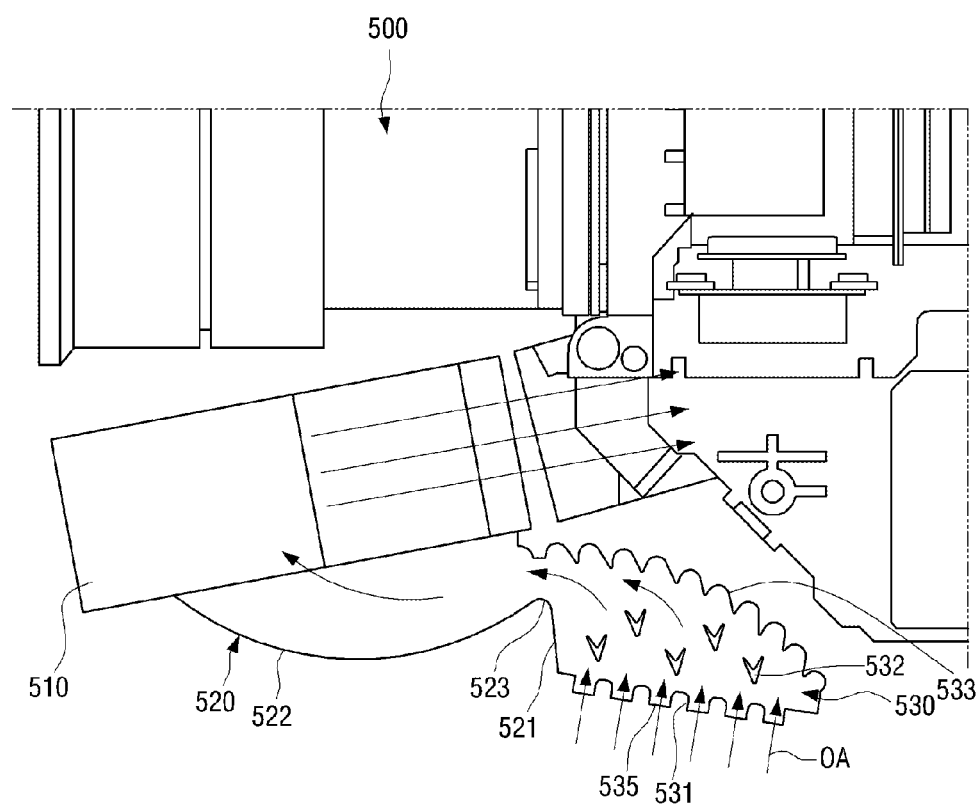
FIG. 13 is a view schematically illustrating a projector having a dust collecting structure for an air-cooling electric apparatus according to an exemplary embodiment.

FIG. 13 is a view schematically illustrating a projector having a dust collecting structure for an air-cooling electric apparatus according to an exemplary embodiment.

Referring to FIG. 13, the projector 500 may include a fan 510, a guide duct 520, a dust collecting structure 530. The fan 510 sucks outer air OA and sends the outer air OA into the projector 500 in which a heat generating source is provided, thereby cooling the projector 500. The fan 510 corresponds to the suction fan 30 of the above-described embodiment. The guide duct 520 connects the fan 510 and the dust collecting structure 530 so as to guide the outer air OA which has passed through the dust collecting structure 530 to the fan 510.

The dust collecting structure 530 is disposed in an entering portion 521 of the guide duct 520, and separates dust from the outer air OA which is sucked in by a suction force of the fan 510. The dust collecting structure 530 may include a plurality of first vortex generating members 531, a plurality of second vortex generating members 532, and a plurality of vortex generating grooves 533.

The plurality of first vortex generating members 531 are arranged to be spaced apart predetermined intervals from each other. Therefore, a suction inlet 535 is formed between two nearby first vortex generating members 531. The plurality of suction inlets 535 which are formed by the plurality of first vortex generating members 531 form an entrance of the guide duct 520. In the present embodiment, the first vortex generating member 531 has a section of a substantially rectangular groove. However, the section of the first vortex generating member 531 may be formed as a curved surface which can help a vortex generation as the first vortex generating member 110 of an exemplary embodiment as described above. The first vortex generating members 531 are the substantially same as the first vortex generating members 110 according to an exemplary embodiment as described above except a section shape thereof.

Figure 14:
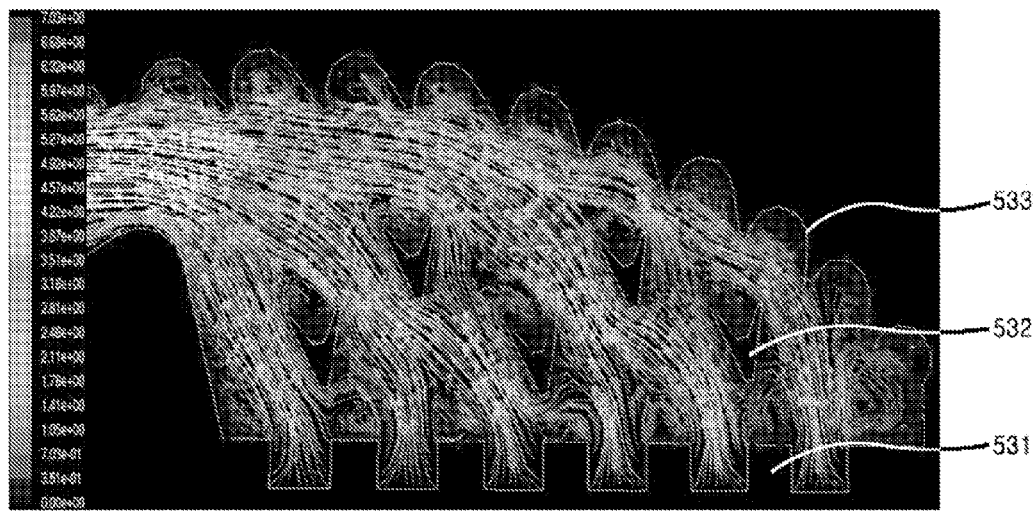
FIG. 14 is a view illustrating a result of a computer simulation of a state in which the dust collecting structure of FIG. 13 collects dust.

The plurality of second vortex generating members 532 are formed as the same shape as that of the second vortex generating members 120 as described above, and are arranged in zigzag on the guide duct 520 behind the plurality of first vortex generating members 531. Therefore, the outer air OA, which has passed through the plurality of first vortex generating members 531, generates vortexes near rear ends of the plurality of second vortex generating members 532 as illustrated in FIG. 14. FIG. 14 is a view illustrating a result of computer simulation of a state in which dust is separated from the outer air OA by the dust collecting structure 530 of FIG. 13.

The plurality of vortex generating grooves 533 are formed on an inner surface of the guide duct 520 which faces the plurality of first vortex generating members 531. Each of the plurality of vortex generating grooves 533 is formed to have a groove entrance to face the plurality of first vortex generating members 531. When the outer air OA is sucked in by the fan 510, as illustrated in FIG. 14, vortexes are generated in the plurality of vortex generating grooves 533 so as to separate dust from the outer air OA and to enclose the dust up therein. When the fan 510 stops, the dust which is confined by the vortex in each of the plurality of vortex generating grooves 533 falls down. A plurality of dust-discharging openings (not illustrated) each of which corresponds to each of the plurality of vortex generating grooves 533 may be formed on a bottom surface of the guide duct 520 in which the plurality of vortex generating grooves 533 are formed. Then, the dust which is separated by the plurality of vortex generating grooves 533 can be discharged outside the guide duct 520.

The guide duct 520 may include an entrance portion 521 in which the dust collecting structure 530 is disposed, a discharging portion 522 which is connected to the fan 510 and a connecting portion 523 which connects the entrance portion 521 and the discharging portion 522, and may be formed as a substantially S shape. The connecting portion 523 may be formed to be narrower than the entrance in which the plurality of first vortex generating members 531 are disposed and the exit which is connected to the fan 510. Then, the dust can be effectively separated from the outer air OA which passes through the guide duct 530.

An operation in which the first and second vortex generating members 531 and 532 in the guide duct 520 which guides the outer air OA to the fan 510 separates dust can be the same as that of the exemplary embodiment as described above. Therefore, a detailed explanation will be omitted.

While the exemplary embodiments of the present disclosure have been described, additional variations and modifications of the exemplary embodiments may occur to those skilled in the art once they learn the basic inventive concepts. Therefore, it is intended that the appended claims shall be construed to include both the above exemplary embodiments and all such variations and modifications that fall within the spirit and scope of the inventive concepts.

What is claimed is:

1. A dust collecting structure for an apparatus which is used in the apparatus having a suction fan for sucking air, the dust collecting structure comprising:
   a plurality of first vortex generating members which are disposed in a case of the apparatus and form a plurality of suction inlets; and
   a plurality of second vortex generating members which are disposed in an inner direction of the case and are spaced apart from the plurality of suction inlets,
   wherein each of the plurality of first vortex generating members projects inside the case and allows the air, which is sucked through the suction inlets by the suction fan, to generate a first vortex near a rear end of at least one of the plurality of first vortex generating members,
   wherein each of the plurality of second vortex generating members divides the air into air streams and allows the divided air streams to generate a second vortex near a rear end of at least one of the plurality of second vortex generating members, and
   wherein the plurality of first and second vortex generating members are formed as a single body with the case.

2. The dust collecting structure of claim 1, wherein the plurality of first vortex generating members are disposed at a predetermined interval in the case, and the plurality of second vortex generating members are spaced a predetermined distance apart.

3. The dust collecting structure of claim 1, wherein the apparatus is an air-cooling electric apparatus.

4. The dust collecting structure of claim 1, wherein at least one of the plurality of first vortex generating members comprises:
   a guide portion which has a curved shape to guide the air which is flowed in through the suction inlet to form the first vortex; and
   wing portions which project from opposite side ends of the guide portion.

5. The dust collecting structure of claim 4, wherein
   a section of the wing portions comprises at least one of a triangle shape, a rectangular shape, and a trapezoid shape.

6. The dust collecting structure of claim 4, wherein the guide portion is formed as a concave shape.

7. The dust collecting structure of claim 1, wherein
   a section of at least one of the plurality of second vortex generating members has a wedge shape, and both side inclined surfaces of the wedge shape are disposed to gather toward a suction inlet.

8. The dust collecting structure of claim 7, wherein
   a first portion of the section of said at least one of the plurality of second vortex generating members which faces the suction inlet comprises a triangle shape.

9. The dust collecting structure of claim 7, wherein
   a first portion of the section of said at least one of the plurality of second vortex generating members which faces the suction inlet comprises a streamlined shape.

10. The dust collecting structure of claim 7, wherein
    a second portion of the at least one of the plurality of second vortex generating members which is opposite to a first portion of the at least one of the plurality of second vortex generation members facing the suction inlet, comprises a groove which generates a flow resistance with respect to the air.

11. The dust collecting structure of claim 1, wherein
    the plurality of second vortex generating members are arranged in at least two rows, and each of second vortex generating members in a back row is arranged to face a space between second vortex generating members in a front row.

12. The dust collecting structure of claim 1, wherein
    the plurality of second vortex generating members are arranged in a zigzag pattern.

13. The dust collecting structure of claim 1, wherein
    the plurality of first and second vortex generating members are disposed in a housing which is detachable to the case.

14. The dust collecting structure of claim 1, further comprising:
    a guide duct which is disposed inside the case and guides the air that has passed through the plurality of first and second vortex generating members to the suction fan; and
    a plurality of vortex generating grooves which are formed on an inner surface of the guide duct and allow the sucked air to generate a vortex.

15. The dust collecting structure of claim 1, further comprising:
    at least one dust-discharging opening which is formed on a bottom side of the case and near the rear end of at least some of the plurality of first and second vortex generating members.

16. The dust collecting structure of claim 1, further comprising:
    at least one dust cling member which is disposed on a rear end of each of at least some of the plurality of first and second vortex generating members.

17. The dust collecting structure of claim 1, further comprising:
    at least one dust-discharging opening which is formed on a bottom side of the case and substantially close to a rear end of at least some of the plurality of first and second vortex generating members; and
    at least one dust cling member which is disposed on a rear end of others of the plurality of first and second vortex generating members.

18. An electric apparatus comprising:
    a suction fan which sucks air, and
    a dust collecting structure, the dust collecting structure comprising:
    a plurality of first vortex generating members which are disposed in a case of the apparatus and form a plurality of suction inlets; and
    a plurality of second vortex generating members which are disposed in the case and are spaced apart from the plurality of suction inlets,
    wherein each of the plurality of first vortex generating members projects inside the case and allows the air, which is sucked through the suction inlets by the suction fan, to generate a vortex near a rear end of at least one of the plurality of first vortex generating members,
    wherein each of the plurality of second vortex generating members divides the air into air streams and allows the divided air streams to generate a vortex near a rear end of at least one of the plurality of second vortex generating members, and
    wherein the plurality of first and second vortex generating members are formed as a single body with the case.

* * * * *